(12) United States Patent
Osumi

(10) Patent No.: US 8,636,970 B2
(45) Date of Patent: Jan. 28, 2014

(54) EXHAUST PURIFICATION DEVICE AND EXHAUST PURIFICATION METHOD FOR DIESEL ENGINE

(75) Inventor: Kazuo Osumi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 13/574,374

(22) PCT Filed: Jan. 24, 2011

(86) PCT No.: PCT/JP2011/051203
§ 371 (c)(1), (2), (4) Date: Jul. 20, 2012

(87) PCT Pub. No.: WO2011/090189
PCT Pub. Date: Jul. 28, 2011

(65) Prior Publication Data
US 2012/0294786 A1  Nov. 22, 2012

(30) Foreign Application Priority Data

Jan. 25, 2010 (JP) ................ 2010-013413

(51) Int. Cl.
B01D 53/94 (2006.01)
F01N 3/035 (2006.01)
F01N 3/10 (2006.01)
F01N 3/18 (2006.01)
F01N 3/24 (2006.01)

(52) U.S. Cl.
USPC ............ 423/213.2; 423/213.5; 423/213.7; 60/274; 60/282; 60/295; 60/299; 60/301; 60/302

(58) Field of Classification Search
USPC ........... 423/213.2, 213.5, 213.7; 60/274, 282, 60/295, 297, 299, 301, 302
See application file for complete search history.

(56) References Cited

U.S. PATENT DOCUMENTS 7,210,288 B2 * 5/2007 Bandl-Konrad et al. ....... 60/297
2004/0118106 A1 6/2004 Liang et al.
(Continued)

FOREIGN PATENT DOCUMENTS

JP 54-086474 10/1979
JP 2004-100489 A 4/2004
(Continued)

OTHER PUBLICATIONS

PCT Search Report for PCT Serial No. PCT/JP2011/051203 dated Apr. 4, 2011.

*Primary Examiner* — Timothy Vanoy
(74) *Attorney, Agent, or Firm* — McCormick, Paulding & Huber LLP

(57) ABSTRACT

An exhaust purification device and an exhaust purification method that utilizes this exhaust purification device enable effective utilization of exhaust gas heat and allow reduction in the size of the device. The exhaust purification device has an oxidation catalyst that is disposed in an exhaust passage of a diesel engine and purifies CO and HC in exhaust gas; a urea injection nozzle that is disposed downstream of the oxidation catalyst and generates ammonia through atomization of urea water into the exhaust gas; a turbine of a turbocharger, this turbine being disposed downstream of the urea injection nozzle and accelerating decomposition of urea through agitation of the atomized urea water; a DPF that is disposed downstream of the turbine and traps PM in the exhaust gas; and a selective reduction catalyst that is disposed downstream of the DPF and detoxifies NOx in the exhaust gas through a reduction reaction with ammonia.

18 Claims, 2 Drawing Sheets

(56) References Cited

U.S. PATENT DOCUMENTS

| | | |
|---|---|---|
| 2006/0112678 A1 | 6/2006 | Kaboord et al. |
| 2006/0153761 A1 | 7/2006 | Bandl-Konrad et al. |
| 2007/0175208 A1 | 8/2007 | Bandl-Konrad et al. |
| 2008/0280184 A1 | 11/2008 | Sakai et al. |
| 2008/0286184 A1 | 11/2008 | Ando et al. |
| 2009/0169451 A1* | 7/2009 | Andreasson et al. ...... 423/213.2 |
| 2010/0008832 A1 | 1/2010 | Oosumi |
| 2010/0077739 A1* | 4/2010 | Rodman et al. ................. 60/301 |
| 2010/0319323 A1* | 12/2010 | Yan ................................ 60/286 |
| 2012/0315204 A1 | 12/2012 | Osumi |

FOREIGN PATENT DOCUMENTS

| | | | | |
|---|---|---|---|---|
| JP | 2004-239109 A | * | 8/2004 | |
| JP | 2005-061362 A | | 3/2005 | |
| JP | 2006-512529 A | | 4/2006 | |
| JP | 2008-279334 A | * | 11/2008 | ............... B01J 29/76 |
| JP | 2009-024619 A | | 2/2009 | |
| JP | 2009-257226 A | | 11/2009 | |
| JP | 2009-264147 A | | 11/2009 | |

* cited by examiner

EXHAUST PURIFICATION DEVICE AND EXHAUST PURIFICATION METHOD FOR DIESEL ENGINE

CROSS REFERENCE TO RELATED APPLICATIONS

This application is entitled to the benefit of and incorporates by reference essential subject matter disclosed in International Patent Application No. PCT/JP2011/051203 filed on Jan. 24, 2011 and Japanese Patent Application No. 2010-013413 filed Jan. 25, 2010.

TECHNICAL FIELD

The present invention relates to an exhaust purification device and exhaust purification method for a diesel engine.

BACKGROUND ART

Hazardous substances such as particulate matter (PM), nitrogen oxide (NOx), carbon monoxide (CO), hydrocarbon (HC) and the like are present in the exhaust gas of diesel engines that are installed in vehicles such as trucks, buses and the like.

Measures taken in recent years to reduce emissions of such hazardous substances from vehicles include measures for reducing the generation of hazardous substances by improving combustion in the diesel engine, and measures for removing, as much as possible, the above-described hazardous substances in the exhaust gas, by arranging a plurality of post-processing units, for instance, an oxidation catalyst (DOC: Diesel Oxidation Catalyst), a diesel particulate filter (DPF: Diesel Particulate Filter), a urea-selective reduction catalyst (urea SCR: Urea-Selective Catalytic Reduction) or a NOx storage-reduction catalyst (LNT: Lean NOx Trap), in an exhaust passage of a diesel engine (see Japanese Patent Application Publication No. 2009-264147 and Japanese Patent Application Publication No. 2009-257226).

DISCLOSURE OF THE INVENTION

However, reducing the generation of hazardous substances through improved combustion in the diesel engine entails a drop of 30 to 50° C., or even greater, in the temperature of the exhaust gas that flows out of the exhaust port of the engine, as compared with a conventional instance (before improvement).

Also, arranging a plurality of post-processing units in an exhaust passage translates into a greater size of the exhaust purification device that is made up of these post-processing units, and into increased heat capacity of the exhaust purification device. Depending on the operating state of the engine, a catalyst activation temperature may be difficult to secure in the exhaust purification device having thus increased heat capacity.

Such an exhaust purification device of greater size, moreover, is disposed at a distance from the engine, on account of the problem of installation space, and the catalyst activation temperature becomes yet more difficult to secure. As a result, this impairs the hazardous-substance reducing effect that is elicited by each post-processing unit of the exhaust purification device.

It is an object of the present invention to provide an exhaust purification device for a diesel engine, and an exhaust purification method that utilizes the exhaust purification device, that enables effective utilization of exhaust gas heat, and that allows reducing the size of the device, by virtue of the design of the layout of each post-processing unit.

In order to attain the above object, the exhaust purification device for a diesel engine according to the present invention includes: an oxidation catalyst that is disposed in an exhaust passage of the diesel engine and purifies CO and HC in exhaust gas; a urea injection nozzle that is disposed in the exhaust passage downstream of the oxidation catalyst and generates ammonia through atomization of urea water into the exhaust gas; a turbine of a turbocharger, this turbine being disposed in the exhaust passage downstream of the urea injection nozzle and accelerating decomposition of urea through agitation of the atomized urea water; a diesel particulate filter that is disposed in the exhaust passage downstream of the turbine and that traps particulate matter in the exhaust gas; and a selective reduction catalyst that is disposed in the exhaust passage downstream of the diesel particulate filter and detoxifies (abates) NOx in the exhaust gas through a reduction reaction with ammonia.

The diesel particulate filter may be not coated with an oxidation catalyst, or may be coated with an oxidation catalyst that oxidizes particulate matter without oxidizing ammonia.

A subsequent-stage oxidation catalyst may be further disposed, in the exhaust passage downstream of the selective reduction catalyst, for detoxifying through oxidation the ammonia that flows out of the selective reduction catalyst.

The oxidation catalyst may have a manifold oxidation catalyst disposed at each cylinder portion of an exhaust manifold of the diesel engine, and a pre-turbine oxidation catalyst disposed at a junction portion of the exhaust manifold; the manifold oxidation catalyst being superior to the pre-turbine oxidation catalyst in CO purification, and the pre-turbine oxidation catalyst being superior to the manifold oxidation catalyst in HC purification.

The manifold oxidation catalyst may be a catalyst that has an oxide semiconductor and an oxide having an oxygen storage material; and the pre-turbine oxidation catalyst may be a metal catalyst.

The oxide having an oxygen storage material may be an oxide containing Ce; and the oxide semiconductor may be $TiO_2$, $ZnO$ or $Y_2O_3$.

A noble metal may be carried on the oxide having an oxygen storage material.

An exhaust purification method that is used in the exhaust purification device for a diesel engine described above includes: generating $2NH_3+H_2SO_4 \rightarrow (NH_4)_2SO_4$ through reaction of ammonia ($NH_3$), generated from urea water atomized out of the urea injection nozzle, and sulfur oxide (SOx) in exhaust gas; generating $(NH_4)2SO_4+CaCO_3 \rightarrow (NH_4)2CO_3+CaSO_4$ through reaction of the $(NH_4)2SO_4$ with $CaCO_3$, which is an ash content that forms after combustion of particulate matter in the diesel particulate filter; generating $(NH_4)2CO_3 \rightarrow 2NH_3+H_2O+CO_2$ through thermal decomposition of the $(NH_4)2CO_3$; and using this $NH_3$ in a reduction reaction of NOx that becomes captured in the selective reduction catalyst.

By virtue of the design of the layout of each post-processing unit, the exhaust purification device and exhaust purification method for a diesel engine according to the present invention enables effective utilization of exhaust gas heat, and allows reducing the size of the device.

By virtue of the design of the layout of each post-processing units, the exhaust purification device and exhaust purification method for a diesel engine according to the present invention enable effective utilization of exhaust gas heat, and allow reducing the size of the device.

MODE FOR CARRYING OUT THE INVENTION

An embodiment of the present invention will be explained next based on accompanying drawings.

Comparative Example

Figure 1:
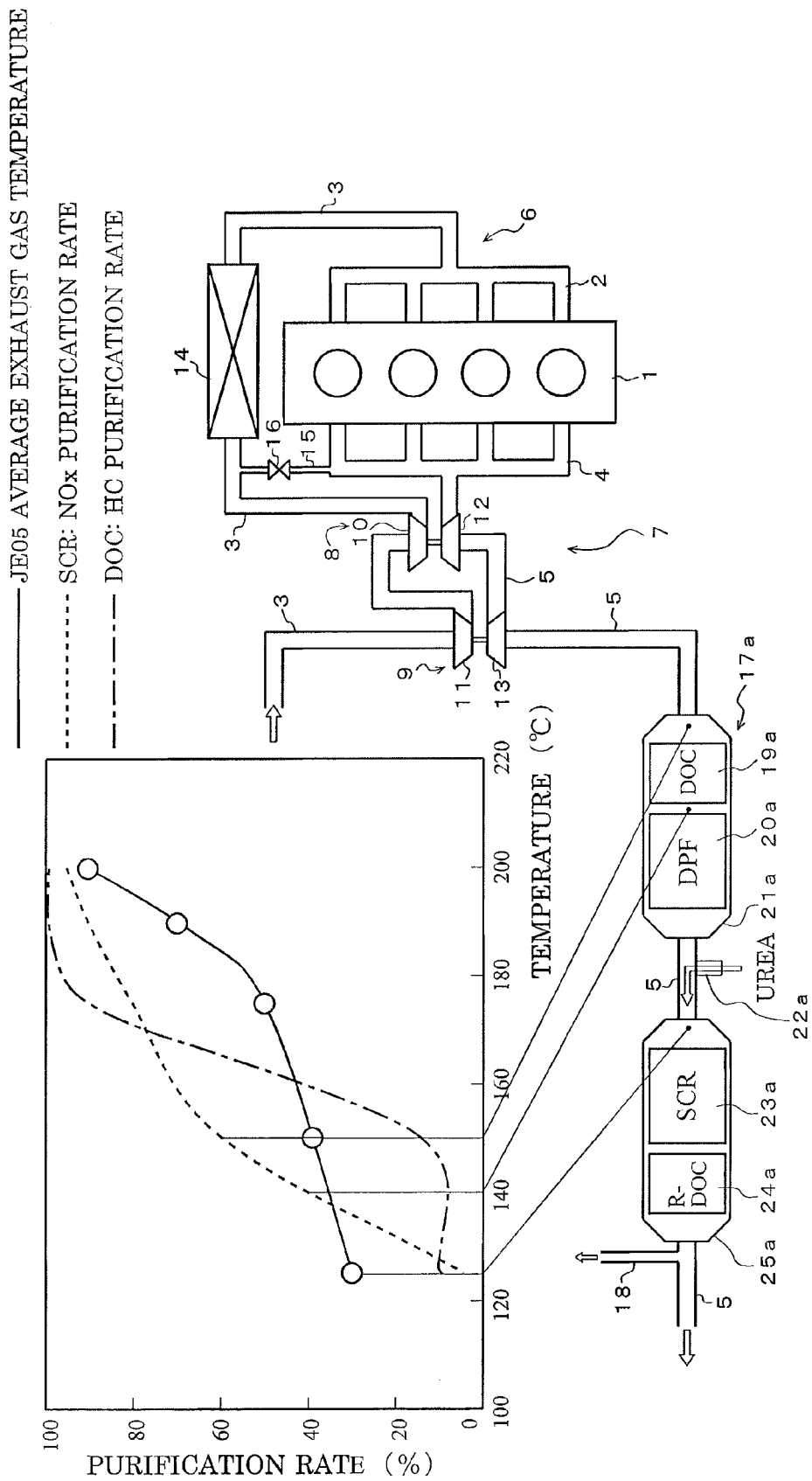
FIG. 1 is an explanatory diagram illustrating an exhaust purification device for a diesel engine according to a comparative example (not an embodiment of the present invention), and illustrating a relationship between SCR and DOC temperature and purification rates.

With reference to FIG. 1, an explanation follows first on a comparative example, for contrast versus the embodiment of the present invention.

As illustrated in FIG. 1, an intake pipe 3 is connected to an intake manifold 2 and an exhaust pipe 5 is connected to an exhaust manifold 4 of a diesel engine 1. The intake manifold 2 and the intake pipe 3 make up an intake passage 6, and the exhaust manifold 4 and the exhaust pipe 5 make up an exhaust passage 7. A high-pressure stage turbocharger (high-pressure stage turbo) 8 and a low-pressure stage turbocharger (low-pressure stage turbo) 9 are connected in series to the intake pipe 3 and the exhaust pipe 5.

Specifically, a high-pressure stage turbine 12 of the high-pressure stage turbo 8 and a low-pressure stage turbine 13 of the low-pressure stage turbo 9 are disposed in the exhaust pipe 5, and a high-pressure stage compressor 10 of the high-pressure stage turbo 8 and a low-pressure stage compressor 11 of the low-pressure stage turbo 9 are disposed in the intake pipe 3. An intercooler 14 is disposed in the intake pipe 3 downstream of the high-pressure stage compressor 10. The exhaust manifold 4 and the intake pipe 3 are connected by an EGR pipe 15. An EGR valve 16 is disposed in the EGR pipe 15. An EGR cooler (not shown) may be provided in the EGR pipe 15.

An exhaust purification device 17a that purifies hazardous substances (PM, NOx, CO, HC and the like) in exhaust gas is disposed in exhaust pipe 5 downstream of the low-pressure stage turbine 13. The exhaust purification device 17a is described further on. The exhaust pipe 5 downstream of the exhaust purification device 17a is connected to a low-pressure EGR pipe 18 that leads part of the exhaust gas that is directed towards a muffler, not shown, to the intake pipe 3 (to any site either upstream of the low-pressure stage compressor 11, between the low-pressure stage compressor 11 and the high-pressure stage compressor 10, or upstream of the high-pressure stage compressor 10). A low-pressure EGR valve (not shown) is provided in the low-pressure EGR pipe 18. An EGR cooler may also be provided.

The exhaust purification device 17a comprises a first casing 21a in the interior where an oxidation catalyst (DOC) 19a and a diesel particulate filter (DPF) 20a are accommodated; a urea injection nozzle 22a that is disposed in the exhaust pipe 5, downstream of the first casing 21a, and that atomizes urea water into the exhaust pipe 5; and a second casing 25a disposed in the exhaust pipe 5 downstream of the urea injection nozzle 22a and that accommodates, in the interior thereof, an urea-selective reduction catalyst (urea SCR) 23a and a subsequent-stage oxidation catalyst (R-DOC: Rear Diesel Oxidation Catalyst) 24a.

The DOC 19a has the function of purifying, through oxidation, CO and HC in the exhaust gas, and of oxidizing NO. The DPF 20a has the function of trapping PM in the exhaust gas. The urea injection nozzle 22a has the function of generating ammonia ($NH_3$) through hydrolysis and thermal decomposition of urea water that is atomized into the exhaust pipe 5. The urea SCR 23a has the function of detoxifying NOx in the exhaust gas into water and nitrogen, through a reduction reaction with ammonia. The R-DOC 24a has the function of detoxifying, through oxidation, the ammonia that flows out of the urea SCR 23a.

In such an exhaust purification device 17a, all the post-processing units (DOC 19a, DPF 20a, urea injection nozzle 22a, SCR 23a and R-DOC 24a) that make up the exhaust purification device 17a are disposed downstream of the low-pressure stage turbine 13, and hence the distance from the exhaust port of the diesel engine 1 up to the exhaust purification device 17a is long. Accordingly, the exhaust gas that flows out of the exhaust port of the diesel engine 1 dumps heat as it passes through the exhaust pipe 5, expands in the low-pressure stage turbine 13, and reaches thereafter the exhaust purification device 17a. In consequence, the temperature of the DOC 19a, the DPF 20a, the SCR 23a and the R-DOC 24a may in some instances fail to rise up to the catalyst activation temperature, depending on the operating state of the diesel engine 1.

For instance, upon operation of the diesel engine 1 on the basis of a transient mode (acceleration and deceleration mode) referred to as JE05 mode, the average inlet temperature of the DOC 19a, the DPF 20a and the SCR 23a was of about 150° C. for the DOC 19a, about 140° C. for the DPF 20a and about 125° C. for the SCR 23a. As illustrated in FIG. 1, the HC purification rate of the DOC 19a at 150° C. is about 10% (likewise the CO purification rate), and the NOx purification rate of the SCR 23a at 125° C. is 5% or less. As a result, the average purification rate in the JE05 mode was 50% or less for all HC, CO and NOx.

To regenerate the DPF 20a (to burn the trapped PM) during a test in the JE05 mode, it is necessary to heat the DPF 20a from 140° C. to 400° C. or above. When post-injection is performed to that end (injection in which fuel is spewed out of an injector, but not for the purpose of combustion in the diesel engine 1, and which takes place after ordinary fuel injection into the combustion chamber of the diesel engine 1), the fuel consumption worsens by about 5%, and HC is generated.

Also, a predetermined distance from the urea injection position of the urea injection nozzle 22a up to the inlet of the SCR 23a is required (it is experimentally found that this distance must be 25 cm or longer) in order to cause the urea water that is atomized into the exhaust pipe 5 from the urea injection nozzle 22a to diffuse homogeneously until reaching the SCR 23a, and to thereby enable the urea water to decompose appropriately into ammonia. This distance translates into a drop in the temperature of the SCR 23a and into a greater size of the exhaust purification device 17a.

Embodiment

An embodiment of the present invention, in which the shortcomings of the above-described comparative example have been addressed, is explained next with reference to FIG. 2. The present embodiment shares constituent elements with those of the comparative example described above. Therefore, shared constituent elements will be referred to using the same reference numerals, and an explanation thereof will be omitted. In the exhaust purification device 17, a suffix "a" denotes the comparative example, while an absence of the suffix "a" denotes the present embodiment.

Figure 2:
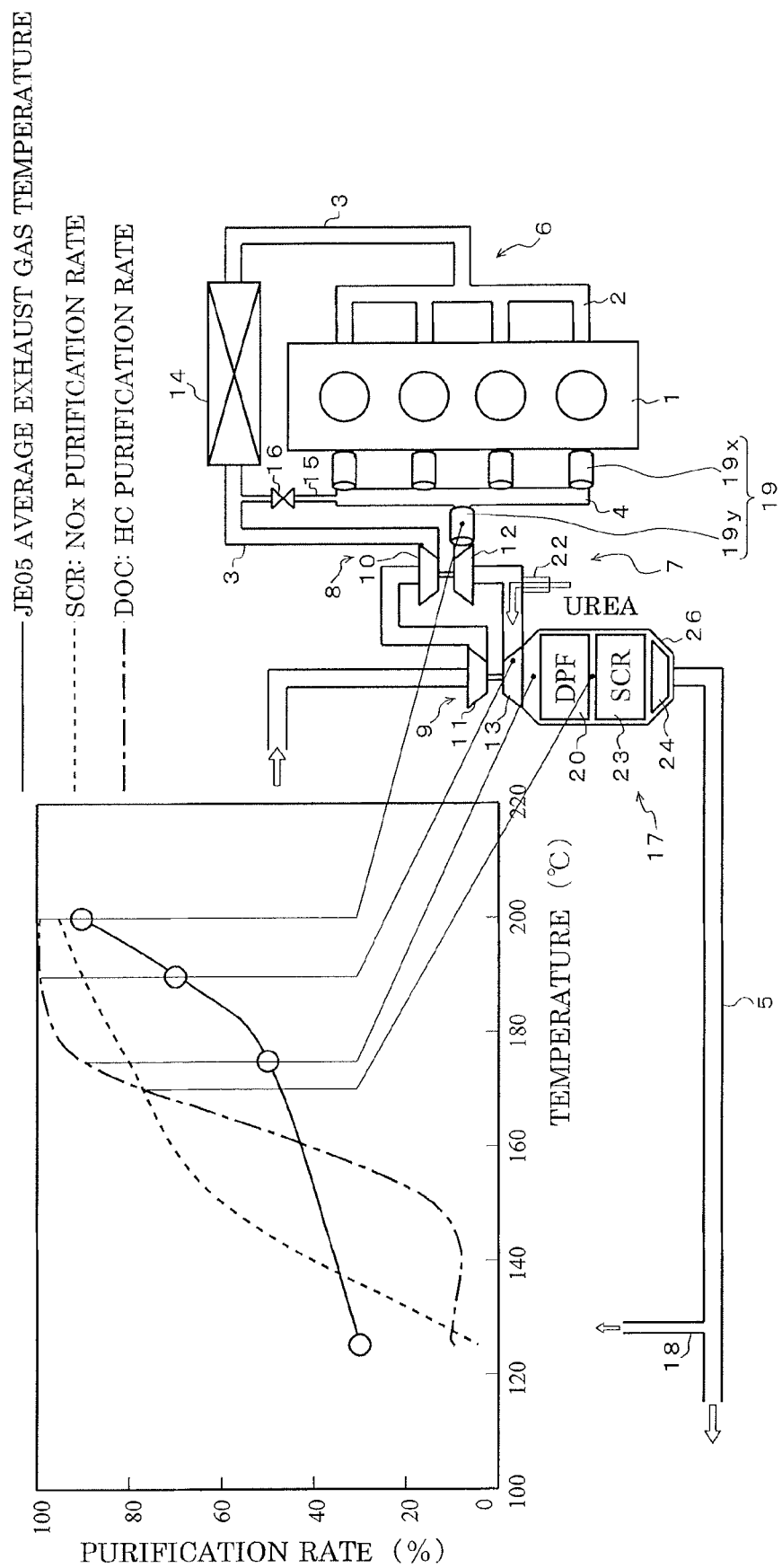
FIG. 2 is an explanatory diagram illustrating an exhaust purification device for a diesel engine according to an embodiment of the present invention, and illustrating a relationship between SCR and DOC temperature and purification rates.

As illustrated in FIG. 2, the exhaust purification device 17 of the diesel engine 1 according to the present embodiment is provided with: a previous-stage oxidation catalyst (DOC) 19, disposed in the exhaust passage 7 of the diesel engine 1, that purifies CO and HC in the exhaust gas and that oxidizes NO; a urea injection nozzle 22 disposed in the exhaust passage 7, downstream of the DOC 19, for generating ammonia through atomization of urea water into the exhaust gas; the turbine (low-pressure stage turbine) 13, disposed in the exhaust passage 7, downstream of the urea injection nozzle 22, and that accelerates decomposition of urea through agitation of the atomized urea water; a diesel particulate filter (DPF) 20 disposed in the exhaust passage 7, downstream of the low-pressure stage turbine 13, that traps particulate matter (PM) in the exhaust gas; and a selective reduction catalyst (urea SCR) 23 disposed in the exhaust passage 7, downstream of the DPF 20, that detoxifies NOx in the exhaust gas through a reduction reaction with ammonia. A subsequent-stage oxidation catalyst (R-DOC) 24 for detoxifying, through oxidation, the ammonia that flows out of the urea SCR 23, is disposed in the exhaust passage 7 downstream of the urea SCR 23.

Each post-processing unit (DOC 19, DPF 20, urea injection nozzle 22, SCR 23 and R-DOC 24) is explained in detail further on.

In the configuration of the present embodiment there is provided a two-stage turbocharger resulting from connecting, in series, the high-pressure stage turbo 8 and the low-pressure stage turbo 9; the urea injection nozzle 22 is provided between the low-pressure stage turbine 13 and the high-pressure stage turbine 12, and the DOC 19 is disposed upstream of the high-pressure stage turbine 12. However, the configuration may involve a single-stage turbocharger, such that the high-pressure stage turbo 8 is omitted. In that case, the urea injection nozzle 22 is disposed upstream of the turbine (low-pressure stage turbine 13 in FIG. 2) of only one of the turbochargers (low-pressure stage turbo 9 in FIG. 2), and the DOC 19 is disposed upstream of the urea injection nozzle 22.

In the exhaust purification device 17 according to the present embodiment, the urea injection nozzle 22 and the DOC 19 are disposed upstream of the low-pressure stage turbine 13. Therefore, the arrangement position of each post-processing unit (DOC 19, DPF 20, SCR 23, R-DOC 24) can thus be brought closer to the exhaust port of the diesel engine 1 than in the case of the comparative example illustrated in FIG. 1, where all the post-processing units, including the urea injection nozzle 22 and the DOC 19, are disposed downstream of the low-pressure stage turbine 13. Accordingly, this allows utilizing effectively the heat of the exhaust gas, and makes it easier to maintain the temperature of the post-processing units at the catalyst activation temperature.

For instance, the average inlet temperature of the DOC 19, the DPF 20 and the SCR 23, upon operation of the diesel engine 1 based on a JE05 mode, was about 200° C. for the DOC 19, about 175° C. for the DPF 20 and about 170° C. for the SCR 23. As illustrated in FIG. 2, the HC purification rate of the DOC 19 at 200° C. is about 100% (likewise the CO purification rate), and the NOx purification rate of the SCR 23 at 170° C. is about 80%. In the present embodiment, thus, the purification rates of HC, CO and NOx are significantly enhanced vis-à-vis those in the comparative example.

In the present embodiment, the DPF 20 is disposed directly below the low-pressure stage turbine 13, and the arrangement position of the DPF 20 lies further upstream, as compared with an instance where the DPF 20a is disposed downstream of the low-pressure stage turbine 13, with the DOC 19a in between, as in the comparative example illustrated in FIG. 1. Therefore, the temperature of the DPF 20 rises more than in the comparative example, and PM trapped in the DPF 20 can be burned, even with reduced post-injection, or even without post-injection, depending on the operating state. As a result, this allows averting impairment of fuel consumption caused by post-injection, and allows suppressing generation of HC due to post-injection.

In the present embodiment, moreover, the urea injection nozzle 22 is disposed upstream of the low-pressure stage turbine 13. Therefore, the urea water atomized out of the urea injection nozzle 22 is agitated by the low-pressure stage turbine 13, and diffuses substantially homogeneously downstream of the low-pressure stage turbine 13. Hydrolysis and thermal decomposition of urea are accelerated as a result, and ammonia can be generated appropriately even though the distance from the urea injection position of the urea injection nozzle 22 up to the inlet of the SCR 23 is shorter than in the comparative example. Thus, the arrangement position of the SCR 23 can be brought closer to the low-pressure stage turbine 13 than is the case in the comparative example. Accordingly, this allows increasing the temperature of the SCR 23 above that in the comparative example, and allows achieving a more compact exhaust purification device 17.

Each post-processing unit is explained in detail next.
DOC

The DOC 19 has manifold oxidation catalysts (M/F-DOCs) 19x that are disposed in respective cylinder portions of the exhaust manifold 4 of the diesel engine 1, and a pre-turbine oxidation catalyst (P/T-DOC) 19y disposed at the junction portion of the exhaust manifold 4. The M/F-DOCs 19x used on the upstream side are superior in CO purification to the P/T-DOC 19y on the downstream side. The P/T-DOC 19y used in the downstream side is superior in HC purification to the M/F-DOCs 19x on the upstream side. That is because, ordinarily, DOCs afford characteristically better HC adsorption/purification if no CO is present in the exhaust gas, but exhibit no impaired CO adsorption/purification even if HC are present in the exhaust gas.

The M/F-DOCS 19x are made up of a catalyst that comprises an oxide semiconductor and an oxide having an oxygen storage material (OSC: Oxygen Storage Capacity) that is superior in CO purification (CO adsorption). The P/T-DOC 19y is made up of a metal catalyst (for instance, a Pt catalyst) superior in HC purification (HC adsorption). Configuring the DOC 19 as described above allows achieving a catalyst configuration that is superior in low-temperature activity, and makes it possible to reduce the size of the DOC 19 as a whole and to arrange the DOC 19 upstream of the high-pressure stage turbine 12 without difficulty.

Each M/F-DOC 19x may be a catalyst layer that comprises a catalyst in which there are mixed an oxide semiconductor and an oxide having OSC. A catalyst wherein a noble metal catalyst (Pt catalyst or the like) and an HC adsorption material are mixed together may be used in the P/T-DOC 19y. An oxide comprising cerium (Ce) (for instance, cerium oxide) may be used in the oxide having OSC, and a noble metal (for instance, Pt) may be carried on the oxide. In the oxide semiconductor there is used $TiO_2$, $ZnO$ or $Y_2O_3$.

The EGR pipe 15 is connected to the exhaust manifold 4 between the M/F-DOCs 19x and the P/T-DOC 19y. After undergoing CO purification by passing through the M/F-DOCs 19x, the exhaust gas passes through the EGR pipe 15 and returns to the intake pipe 3. Unburned substances (SOF component: soluble organic fraction elements) in the returning exhaust gas decrease as a result, and the adverse influence that the SOF exerts on the EGR valve 16 and the EGR cooler (not shown), for instance contamination, clogging and so forth, can be suppressed.

Urea Injection Nozzle

The urea injection nozzle 22 is disposed in the exhaust pipe 5 upstream of the low-pressure stage turbine 13. As a result, urea water atomized out of the urea injection nozzle 22 is agitated by the low-pressure stage turbine 13, and diffuses substantially homogeneously downstream of the low-pressure stage turbine 13, so that hydrolysis and thermal decomposition of urea are thus accelerated. As a result, the distance from the urea injection position of the urea injection nozzle 22 up to the inlet of the SCR 23 can be made shorter than in the comparative example, the temperature of the SCR 23 can be increased above that in the comparative example, as already explained, and the exhaust purification device 17 can be made more compact.

Although sulfur oxide (SOx) is generated in the exhaust gas during high EGR combustion, corrosion of the exhaust pipe 5 and the low-pressure stage turbine 13 due to this SOx can be suppressed by virtue of the reactions below.

Firstly, the urea water atomized out of the urea injection nozzle 22 undergoes hydrolysis and thermal decomposition to generate ammonia ($NH_3$), which reacts with $SO_4$ and so forth in the exhaust gas, to generate $2NH_3+H_2SO_4 \rightarrow (NH_4)_2SO_4$. The generated $(NH_4)_2SO_4$ is a neutral substance, and hence the problem of corrosion of the exhaust pipe 5 and the low-pressure stage turbine 13 does not occur.

The generated $(NH_4)_2SO_4$ reacts with $CaCO_3$, which is the ash content that forms after combustion of PM in the DPF 20. As a result there is generated $(NH_4)2SO_4+CaCO_3 \rightarrow (NH_4)2CO_3+CaSO_4$. The generated $(NH_4)2CO_3$ undergoes thermal decomposition, as described below, at or above a predetermined temperature (for instance, 58° C.): $(NH_4)2CO_3 \rightarrow 2NH_3+H_2O+CO_2$.

Thereafter, the $NH_3$ generated by thermal decomposition is captured in the SCR 23 that is disposed downstream of the DPF 20, and is used in a reduction reaction (purification reaction) of NOx in the SCR 23.

DPF

The DPF 20 that is used is a DPF not coated with an oxidation catalyst for combustion (oxidation) of the trapped PM, or is coated with a special oxidation catalyst for oxidizing PM without oxidizing ammonia ($NH_3$). That is because if $NH_3$ is oxidized in the DPF 20, the $NO_x$ reduction reaction (purification reaction) that utilizes $NH_3$ cannot then take place in the SCR 23 that is disposed downstream of the DPF 20.

Specifically, the DPF 20 is configured in such a manner that a filter main body is not coated with a noble metal catalyst that is ordinarily used; herein, no catalyst is coated at all, or alternatively, the filter main body is coated with a rare earth oxide-based or alkaline earth oxide-based catalyst of substantial basicity. That is because, although PM adheres to rare earth oxide-based or alkaline earth oxide-based catalysts, $NH_3$ does so with difficulty. Accordingly, these catalysts characteristically oxidize PM but virtually no $NH_3$.

In the structure of the filter main body of the DPF 20, the porosity, pore size, and wall thickness are optimized so that the purification characteristics (PM trapping characteristics) are similar to those of conventional products, and in such a manner that pressure loss is small. Thanks to these improvements, a small DPF was used that had a volume 50% or more smaller than that in a conventional product.

In the embodiment of FIG. 2, the DPF 20, the SCR 23 and the R-DOC 24 are accommodated in the casing 26 that is formed integrally with the turbine housing of the low-pressure stage turbine 13, but the casing 26 may be separate from the turbine housing, and may be connected to the latter by way of a short exhaust pipe.

SCR

The SCR 23 is disposed at a position downstream of the DPF 20, in the casing 26, and has the function of detoxifying NOx in the exhaust gas into water and nitrogen, through a reduction reaction with ammonia ($NH_3$).

Through the use of a catalyst carrier (monolith catalyst) or the like, a small SCR was used that had an increased amount of catalyst per specific volume, and in which the volume was reduced by 50% or more with respect to a conventional instance.

R-DOC

The R-DOC 24 is disposed at a position downstream of the SCR 23, in the casing 26, and has the function of detoxifying, through oxidation, excess ammonia ($NH_3$) that flows out of the SCR 23 without having been consumed in the reduction reaction in the SCR 23.

The R-DOC 24 can be omitted if the atomization amount of urea water is controlled, in accordance with the operating state of the diesel engine 1, in such a manner that all the ammonia ($NH_3$) that is generated from the urea water atomized out of the urea injection nozzle 22 is consumed in the SCR 23.

What is claimed is:

1. An exhaust purification device for a diesel engine, the device comprising:
an oxidation catalyst that is disposed in an exhaust passage of the diesel engine and purifies CO and HC in exhaust gas;
a urea injection nozzle that is disposed in the exhaust passage downstream of the oxidation catalyst and generates ammonia through atomization of urea water into the exhaust gas;
a turbine of a turbocharger, this turbine being disposed in the exhaust passage downstream of the urea injection nozzle and accelerating decomposition of urea through agitation of the atomized urea water;
a diesel particulate filter that is disposed in the exhaust passage downstream of the turbine and that traps particulate matter in the exhaust gas; and
a selective reduction catalyst that is disposed in the exhaust passage downstream of the diesel particulate filter and detoxifies NOx in the exhaust gas through a reduction reaction with ammonia;
wherein the oxidation catalyst has a first oxidation catalyst and a second oxidation catalyst, the first oxidation catalyst being superior to the second oxidation catalyst in CO purification, and the second oxidation catalyst being superior to the first oxidation catalyst in HC purification;
wherein the exhaust passage and an intake passage of the diesel engine are connected by an EGR passage; and
wherein the EGR passage is connected to the exhaust passage between the first oxidation catalyst and the second oxidation catalyst.

2. The exhaust purification device for a diesel engine according to claim 1, wherein the diesel particulate filter is not coated with an oxidation catalyst, or is coated with an oxidation catalyst that oxidizes particulate matter without oxidizing ammonia.

3. The exhaust purification device for a diesel engine according to claim 1, further comprising a subsequent-stage oxidation catalyst that is disposed in the exhaust passage downstream of the selective reduction catalyst and that detoxifies, through oxidation, the ammonia that flows out of the selective reduction catalyst.

4. The exhaust purification device for a diesel engine according to claim 1, wherein
the first oxidation catalyst is a manifold oxidation catalysts disposed at each cylinder portion of an exhaust manifold of the diesel engine; and
the second oxidation catalyst is a pre-turbine oxidation catalyst disposed at a junction portion of the exhaust manifold.

5. The exhaust purification device for a diesel engine according to claim 4, wherein
the manifold oxidation catalyst is a catalyst that includes an oxide semiconductor and an oxide having an oxygen storage material, and
the pre-turbine oxidation catalyst is a metal catalyst.

6. The exhaust purification device for a diesel engine according to claim 5, wherein
the oxide having an oxygen storage material is an oxide including Ce, and
the oxide semiconductor is $TiO_2$, $ZnO$ or $Y_2O_3$.

7. The exhaust purification device for a diesel engine according to claim 5, wherein a noble metal is carried on the oxide having an oxygen storage material.

8. An exhaust purification method for a diesel engine utilizing the exhaust purification device for a diesel engine according to claim 1, the method comprising:
generating $2NH_3+H_2SO_4 \rightarrow (NH_4)_2SO_4$ through reaction of ammonia ($NH_3$), generated from urea water atomized out of a urea injection nozzle, and sulfur oxide (SOx) in exhaust gas;
generating $(NH_4)_2SO_4+CaCO_3 \rightarrow (NH_4)2CO_3+CaSO_4$ through reaction of the $(NH_4)2SO_4$ with $CaCO_3$, which is an ash content that forms after combustion of particulate matter in the diesel particulate filter;
generating $(NH_4)2CO_3 \rightarrow 2NH_3+H_2O+CO_2$ through thermal decomposition of the $(NH_4)_2CO_3$; and
using this $NH_3$ in a reduction reaction of NOx that becomes captured in the selective reduction catalyst.

9. The exhaust purification device for a diesel engine according to claim 2, further comprising a subsequent-stage oxidation catalyst that is disposed in the exhaust passage downstream of the selective reduction catalyst and that detoxifies, through oxidation, the ammonia that flows out of the selective reduction catalyst.

10. The exhaust purification device for a diesel engine according to claim 2, wherein
the first oxidation catalyst is a manifold oxidation catalysts disposed at each cylinder portion of an exhaust manifold of the diesel engine; and
the second oxidation catalyst is a pre-turbine oxidation catalyst disposed at a junction portion of the exhaust manifold.

11. The exhaust purification device for a diesel engine according to claim 3, wherein
the first oxidation catalyst is a manifold oxidation catalysts disposed at each cylinder portion of an exhaust manifold of the diesel engine; and
the second oxidation catalyst is a pre-turbine oxidation catalyst disposed at a junction portion of the exhaust manifold.

12. The exhaust purification device for a diesel engine according to claim 6, wherein a noble metal is carried on the oxide having an oxygen storage material.

13. An exhaust purification method for a diesel engine utilizing the exhaust purification device for a diesel engine according to claim 2,
the method comprising:
generating $2NH_3+H_2SO_4 \rightarrow (NH_4)_2SO_4$ through reaction of ammonia ($NH_3$), generated from urea water atomized out of a urea injection nozzle, and sulfur oxide (SOx) in exhaust gas;
generating $(NH_4)_2SO_4+CaCO_3 \rightarrow (NH_4)2CO_3+CaSO_4$ through reaction of the $(NH_4)2SO_4$ with $CaCO_3$, which is an ash content that forms after combustion of particulate matter in the diesel particulate filter;
generating $(NH_4)2CO_3 \rightarrow 2NH_3+H_2O+CO_2$ through thermal decomposition of the $(NH_4)2CO_3$; and
using this $NH_3$ in a reduction reaction of NOx that becomes captured in the selective reduction catalyst.

14. An exhaust purification method for a diesel engine utilizing the exhaust purification device for a diesel engine according to claim 3, the method comprising:
generating $2NH_3+H_2SO_4 \rightarrow (NH_4)_2SO_4$ through reaction of ammonia ($NH_3$), generated from urea water atomized out of a urea injection nozzle, and sulfur oxide (SOx) in exhaust gas;
generating $(NH_4)_2SO_4+CaCO_3 \rightarrow (NH_4)2CO_3+CaSO_4$ through reaction of the $(NH_4)_2SO_4$ with $CaCO_3$, which is an ash content that forms after combustion of particulate matter in the diesel particulate filter;
generating $(NH_4)2CO_3 \rightarrow 2NH_3+H_2O+CO_2$ through thermal decomposition of the $(NH_4)2CO_3$; and
using this $NH_3$ in a reduction reaction of NOx that becomes captured in the selective reduction catalyst.

15. An exhaust purification method for a diesel engine utilizing the exhaust purification device for a diesel engine according to claim 4,
the method comprising:
generating $2NH_3+H_2SO_4 \rightarrow (NH_4)_2SO_4$ through reaction of ammonia ($NH_3$), generated from urea water atomized out of a urea injection nozzle, and sulfur oxide (SOx) in exhaust gas;
generating $(NH_4)_2SO_4+CaCO_3 \rightarrow (NH_4)2CO_3+CaSO_4$ through reaction of the $(NH_4)2SO_4$ with $CaCO_3$, which is an ash content that forms after combustion of particulate matter in the diesel particulate filter;
generating $(NH_4)2CO_3 \rightarrow 2NH_3+H_2O+CO_2$ through thermal decomposition of the $(NH_4)2CO_3$; and
using this $NH_3$ in a reduction reaction of NOx that becomes captured in the selective reduction catalyst.

16. An exhaust purification method for a diesel engine utilizing the exhaust purification device for a diesel engine according to claim 5,
the method comprising:
generating $2NH_3+H_2SO_4 \rightarrow (NH_4)_2SO_4$ through reaction of ammonia ($NH_3$), generated from urea water atomized out of a urea injection nozzle, and sulfur oxide (SOx) in exhaust gas;
generating $(NH_4)_2SO_4+CaCO_3 \rightarrow (NH_4)2CO_3+CaSO_4$ through reaction of the $(NH_4)2SO_4$ with $CaCO_3$, which is an ash content that forms after combustion of particulate matter in the diesel particulate filter;
generating $(NH_4)2CO_3 \rightarrow 2NH_3+H_2O+CO_2$ through thermal decomposition of the $(NH_4)2CO_3$; and
using this $NH_3$ in a reduction reaction of NOx that becomes captured in the selective reduction catalyst.

17. An exhaust purification method for a diesel engine utilizing the exhaust purification device for a diesel engine according to claim 6, the method comprising:

generating $2NH_3+H_2SO_4 \rightarrow (NH_4)_2SO_4$ through reaction of ammonia ($NH_3$), generated from urea water atomized out of a urea injection nozzle, and sulfur oxide (SOx) in exhaust gas;

generating $(NH_4)_2SO_4+CaCO_3 \rightarrow (NH_4)2CO_3+CaSO_4$ through reaction of the $(NH_4)_2SO_4$ with $CaCO_3$, which is an ash content that forms after combustion of particulate matter in the diesel particulate filter;

generating $(NH_4)2CO_3 \rightarrow 2NH_3+H_2O+CO_2$ through thermal decomposition of the $(NH_4)2CO_3$; and using this $NH_3$ in a reduction reaction of NOx that becomes captured in the selective reduction catalyst.

18. An exhaust purification method for a diesel engine utilizing the exhaust purification device for a diesel engine according to claim 7, the method comprising:

generating $2NH_3+H_2SO_4 \rightarrow (NH_4)_2SO_4$ through reaction of ammonia ($NH_3$), generated from urea water atomized out of a urea injection nozzle, and sulfur oxide (SOx) in exhaust gas;

generating $(NH_4)_2SO_4+CaCO_3 \rightarrow (NH_4)2CO_3+CaSO_4$ through reaction of the $(NH_4)2SO_4$ with $CaCO_3$, which is an ash content that forms after combustion of particulate matter in the diesel particulate filter;

generating $(NH_4)2CO_3 \rightarrow 2NH_3+H_2O+CO_2$ through thermal decomposition of the $(NH_4)2CO_3$; and using this $NH_3$ in a reduction reaction of NOx that becomes captured in the selective reduction catalyst.

\* \* \* \* \*